(12) United States Patent
Warren

(10) Patent No.: US 10,913,354 B2
(45) Date of Patent: Feb. 9, 2021

(54) AUGMENTED REALITY DEVICES AND METHODS FOR ALIGNING AND MOUNTING SAFETY DEVICES IN VEHICLES

(71) Applicant: Robert Lee Warren, Lancaster, PA (US)

(72) Inventor: Robert Lee Warren, Lancaster, PA (US)

(*) Notice: Subject to any disclaimer, the term of this patent is extended or adjusted under 35 U.S.C. 154(b) by 125 days.

(21) Appl. No.: 16/267,267

(22) Filed: Feb. 4, 2019

(65) Prior Publication Data
US 2019/0344662 A1 Nov. 14, 2019

Related U.S. Application Data

(63) Continuation-in-part of application No. 15/346,632, filed on Nov. 8, 2016, now Pat. No. 10,196,006.

(51) Int. Cl.
B60R 11/04 (2006.01)
B60K 35/00 (2006.01)
B60J 1/20 (2006.01)

(52) U.S. Cl.
CPC ............ B60K 35/00 (2013.01); B60J 1/20 (2013.01); B60K 2370/177 (2019.05); B60K 2370/178 (2019.05); B60K 2370/785 (2019.05)

(58) Field of Classification Search
CPC ..... B60R 11/04; B60R 2011/0026; B60J 1/02
USPC .................................. 33/286, 288, 563, 566
See application file for complete search history.

(56) References Cited

U.S. PATENT DOCUMENTS

| | | | | | |
|---|---|---|---|---|---|
| 3,772,795 | A | * | 11/1973 | Calvet | B60Q 9/008 33/264 |
| 3,834,036 | A | * | 9/1974 | Scarritt, Sr. | B62D 15/00 33/264 |
| 4,016,653 | A | * | 4/1977 | Bartlett | B62D 15/02 33/264 |
| 4,079,519 | A | * | 3/1978 | Carmouche | B62D 15/00 33/264 |
| 5,146,686 | A | * | 9/1992 | Brown | A01B 69/001 172/430 |
| 5,472,168 | A | * | 12/1995 | Tapp | B29C 33/307 249/139 |
| 6,345,586 | B1 | * | 2/2002 | Okada | G01C 3/22 116/201 |
| 6,550,153 | B1 | * | 4/2003 | Keith | E04F 21/003 33/194 |
| 7,293,368 | B1 | * | 11/2007 | Faulk | G01C 11/00 33/194 |
| 7,650,698 | B2 | * | 1/2010 | Stewart, III | B60Q 1/484 33/264 |
| 10,196,006 | B1 | * | 2/2019 | Warren | B60R 11/04 |

(Continued)

Primary Examiner — George B Bennett
(74) Attorney, Agent, or Firm — Rhodes IP PLC; Christopher R Rhodes

(57) ABSTRACT

Certain configurations are described of methods, systems and devices that can be used to assist in mounting a vehicle safety device in an automobile, truck, train or other vehicle. In some examples, an augmented reality device designed to permit viewing of a virtual template on a windshield or a bumper can be used to mount or align a safety device to the windshield. In some instances, the virtual template may comprise one or more virtual alignment indicators or markings that facilitate mounting of the vehicle safety device in a selected position or to the windshield.

20 Claims, 12 Drawing Sheets

(56) References Cited

U.S. PATENT DOCUMENTS

| | | | | |
|---|---|---|---|---|
| 2002/0174822 A1* | 11/2002 | Royal | ............... | B60R 1/02 |
| | | | | 116/28 R |
| 2004/0111901 A1* | 6/2004 | Newcomer | ............ | G01C 15/00 |
| | | | | 33/286 |
| 2008/0052941 A1* | 3/2008 | Nyberg | ............... | E04F 21/00 |
| | | | | 33/566 |
| 2011/0219632 A1* | 9/2011 | Odom | ............... | A01B 69/007 |
| | | | | 33/228 |
| 2011/0225925 A1* | 9/2011 | Sprague | ............ | E04F 11/1851 |
| | | | | 52/745.05 |
| 2015/0240400 A1* | 8/2015 | Baker | ............... | D05B 97/12 |
| | | | | 33/566 |

* cited by examiner

1510

1520

1530

1540

AUGMENTED REALITY DEVICES AND METHODS FOR ALIGNING AND MOUNTING SAFETY DEVICES IN VEHICLES

PRIORITY APPLICATION

This application is a continuation-in-part of U.S. Ser. No. 15/346,632 filed on Nov. 8, 2016, the entire disclosure of which is hereby incorporated herein by reference for all purposes.

TECHNOLOGICAL FIELD

Certain embodiments described herein are directed to devices and systems which can use a virtual template visualized using one or more augmented realty devices to permit aligning and/or mounting of vehicle safety devices in vehicles. More particularly, certain embodiments are described which are directed to virtual templates which can be viewed and used to align and/or mount one or more vehicle safety devices in a vehicle.

BACKGROUND

Vehicle safety devices are commonly present in newer vehicles such as automobiles and trucks. Many older vehicles lack safety devices, but aftermarket safety devices can be purchased and installed.

SUMMARY

Certain aspects are described that use an augmented reality device to visualize a virtual template or virtual alignment indicators to permit alignment and/or mounting of safety devices in vehicles.

In an aspect, a method of mounting a vehicle safety device to a windshield of a vehicle comprises visualizing a virtual template on the windshield of the vehicle using an augmented reality device, the virtual template comprising at least one virtual alignment indicator present on the virtual template in a first position, wherein the first position corresponds to a position where a vehicle safety device is to be mounted to the windshield of the vehicle, and aligning the vehicle safety device with the virtual alignment indicator on the virtual template prior to mounting the vehicle safety device to the windshield of the vehicle.

In certain embodiments, the augmented reality device is a mobile device. For example, the mobile device is a cellular phone, a tablet, a laptop computer, wearable glasses or other augmented reality devices.

In some examples, the method comprises configuring the virtual template with a second virtual alignment indicator.

In certain embodiments, a size of the virtual template changes as a user of the augmented reality device gets closer to the windshield.

In other embodiments, the vehicle is one of a passenger automobile, a truck, a train, a bus, a subway car, an airplane or an unmanned aerial vehicle.

In some examples, the method comprises removing the virtual alignment indicator from view on the virtual template after the vehicle safety device is mounted.

In some embodiments, the virtual template is visualized or viewed from an interior of the vehicle whereas in other embodiments, the template is visualized or viewed from an exterior of the vehicle.

In certain examples, the method comprises using the augmented reality device to determine a size of the windshield and retrieving the virtual template from a database using the determined size of the windshield. In some embodiments, the database is located on a device remote from the augmented reality device.

In certain examples, the method comprises scanning a mounting position of the aligned vehicle safety device. In other examples, the method comprises testing the scanned mounting position by displaying an image on the augmented reality device.

In another aspect, a kit for mounting a vehicle safety device to a windshield of a vehicle comprises an augmented reality device configured to provide a virtual template on the windshield to permit alignment and mounting of the vehicle safety device to the windshield, and instructions for using the augmented reality device to align and mount the vehicle safety device to the windshield.

In certain examples, the kit comprises application software comprising a plurality of different virtual templates. In other examples, the augmented reality device of the kit comprises wearable glasses or a mobile device such as a cellular phone, a tablet or a laptop computer.

In another aspect, a kit for mounting a vehicle safety device to a windshield of a vehicle comprises application software comprising a plurality of different virtual templates configured to be visualized on a windshield of a vehicle using an augmented reality device.

Additional aspect, examples, embodiments and features are described in more detail below.

BRIEF DESCRIPTION OF THE FIGURES

Certain illustrative configurations are described below with reference to the accompanying figures in which.

Figure 1:
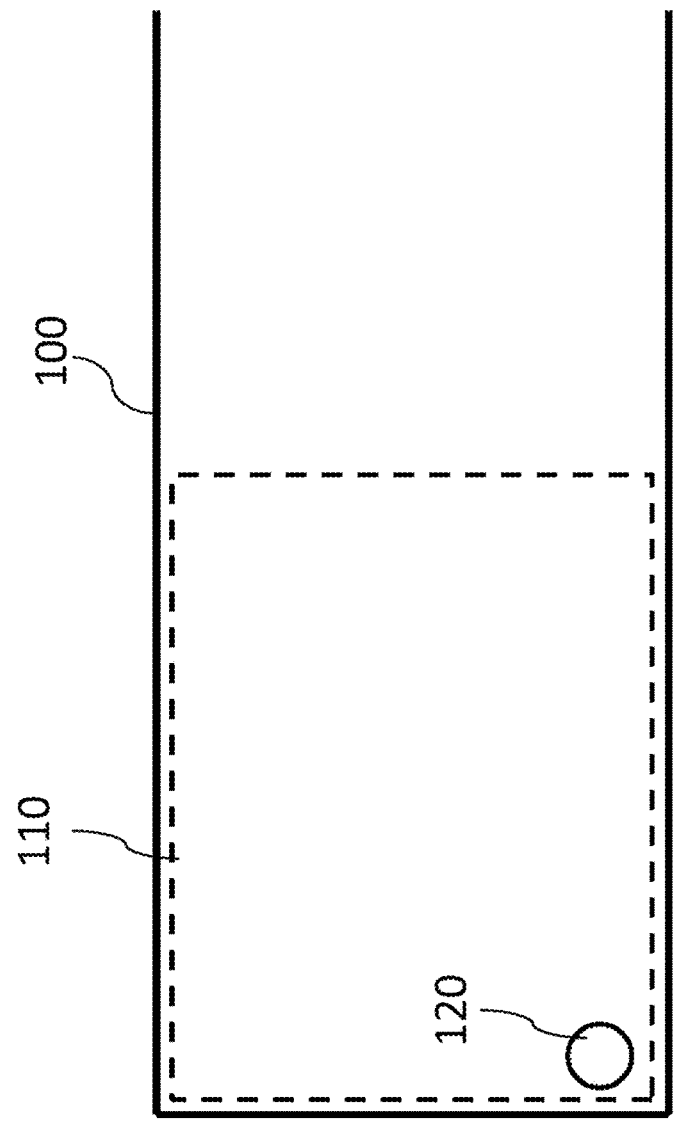
FIG. 1 is an illustration of a virtual template viewed on top of a windshield section, in accordance with certain embodiments.

It will be recognized by the person of ordinary skill in the art, given the benefit of this disclosure, that the dimensions of the templates, windshields, etc. are not necessarily to scale and other dimensions, shapes, geometries and configurations than those described herein may also be used.

DETAILED DESCRIPTION

Certain configurations of a template which can be used to mount and/or align one or more vehicle safety devices inside or outside of a vehicle are described below. In some examples, the template is virtual in that it has no physical form but is instead viewable through one or more suitable augmented reality (A/R) devices. The AR device can be wearable, e.g., take the form of glasses, or may be hand held, mounted to a hat, helmet, head harness or take other forms to permit a user to view a virtual template using the AR device. The virtual template can be two-dimensional or three-dimensional as desired. While not required, the vehicle safety device is typically mounted in contact with a windshield (or other opening) by aligning some portion of the vehicle safety device with one or more virtual alignment indicator(s) of the virtual template.

In certain examples, the exact vehicle safety device added or included in the vehicle may vary. For example, the vehicle safety device may comprise a camera, optical sensors and/or other features to permit the vehicle device to perform lane keeping measurements, collision avoidance sensing measurements, may be used for speed sensing measurements, may be used to detect objects such as pedestrians, other vehicles or other stationary or moving objects, may be used to record video, audio, etc., can be used to provide dynamic radar based cruise control to maintain a set distance between vehicles or can be used for other purposes. The vehicle safety device may be mounted in the interior portion of a vehicle cabin or can be mounted outside of the vehicle cabin, e.g., in or behind a bumper, bumper cover, fender well, mirror, mirror cover, etc. The vehicle safety device can be mounted looking forward, e.g., facing toward the front of the vehicle, looking backward, e.g., facing toward the rear of the vehicle and/or looking to the side, down toward a road, train-track, runway, etc., or looking upward toward the sky. As noted in more detail below, the virtual template can be used with windshields, bumpers, etc. on vehicles such as passenger automobiles, buses, subway vehicles, trains, planes, ships, aerospace vehicles such as satellites, unmanned aerial vehicles and the like.

In certain embodiments, the virtual templates described herein can generally be viewed using one or more suitable augmented realty (A/R) devices. Illustrative A/R devices include but are not limited to, wearable glasses, smart glasses, wearable goggles, contact lenses, a headset with a visual display, mobile devices such as cellular phones, tablets, laptops, computers, etc. or larger devices with a microprocessor. In some instances, the A/R device permits the user to view a display screen on the A/R device that shows the virtual template. For example, in the case of smart glasses, the smart glasses can provide a virtual image of an alignment indicator in a suitable spot on the windshield to permit the wearer to place the safety device at an appropriate position. If desired, the windshield may comprise integral alignment indicators, position indicators, etc. which can be detected and used by the A/R device to determine the appropriate position of the safety device to be mounted/aligned. Examples of hardware and software components that can be present in the A/R devices are described in more detail below.

In certain embodiments, the methods and devices described herein may be configured to permit viewing of a virtual template which is placed or positioned over a suitable area of a windshield of a vehicle. For example and referring to FIG. 1, a front view of a section of a windshield 100 is shown as being a generally flat planar structure, but it may be curved or take shapes other than a flat planar structure. A virtual template 110 is shown as being superimposed over the windshield 100. The virtual template 110 may comprise markings, indicia, cut-outs, etc. generally in the shape of a safety device to be mounted inside the cabin of the vehicle adjacent to the windshield 100. For example, the virtual template 110 comprises a round alignment indicator 120 positioned at a suitable site on the virtual template 110 such that placement of the safety device (not shown) within the alignment indicator 120 (when the virtual template 110 is viewed through the A/R device) will result in proper mounting and alignment of the safety device without the need to make adjustments to the safety device. While not shown, the virtual template 110 may be sized and arranged to span from "edge-to-edge" of the windshield 100 when the A/R device is remote from the windshield. As a user approaches the windshield 100, the size of the virtual template 100 may decrease and move toward an area of the windshield 100 where the safety device is to be mounted to permit the A/R device holder to move and mount the safety device.

In use, the virtual template 110 can be switched on or off as desired by the user of the A/R device to permit viewing or not viewing of the virtual template 110. If desired, the virtual template may also comprise virtual instructions related aligning and/or mounting of the vehicle. These instructions can be varied based on the particular device to be aligned. For example, the A/R device may view or scan the device to be aligned/mounted and then retrieve suitable instructions from a database, e.g., wirelessly, which can be displayed on the A/R device or the virtual template to permit mounting/alignment of that particular type of device.

In certain examples, the exact configuration of the virtual template 110 permits the virtual template 110 to sized and arranged in many different manners. For example, the virtual template 110 can take the form of a generally clear template with suitable virtual markings, the virtual template can be colored or have areas which are darkened or can change colors after the safety device has been properly mounted/aligned.

In other instances, the virtual template can also be used with a physical template such as, for example, a film that can couple to the windshield using static cling. In yet other configurations, the physical template may be taped, adhered or otherwise attached to the windshield using external attachment means including, but not limited to, tape, glue, mechanical supports, held in place by an installer or by other means to place the template against some surface of the windshield at least for some period. The physical template can be coupled to the outside of the windshield or the inside of the windshield or one template can be present on the outside of a windshield and a second template can be present on the inside of a windshield. Alternatively, a virtual template can be used when the user is looking at the windshield from an interior space of the vehicle, and a physical template can be used when the user is looking at the windshield from an exterior of the vehicle.

In certain embodiments, where a physical template is used, the physical template may generally be a lightweight structure weighing less than about ten pounds to permit a single person to couple the template to a windshield. The physical template may be rigid, flexible, bendable, or have other properties depending on the type of vehicle windshield the template is to be used with. The physical template can be designed for single use or may be reusable. In some instances, the physical template may comprise one or more of cardboard, plywood, acrylic, ABS plastic, melamine, vinyl based materials, vinyl with adhesive, static cling, and paper. In certain examples, the physical template may comprise an olefin polymer, e.g., polyethylene, polypropylene, etc., to provide for a lightweight template, generally be transparent and to permit easy application and removal from the windshield. The alignment indicator(s) may be integral to the physical template during production of the physical template or can be added to the physical template, e.g., using stickers, labels, etc., post-production of the template. In other instances, the physical template may lack any alignment indicators, and virtual alignment indicators viewable through the A/R device can be used with the physical template to align the safety device.

In some instances, the physical template can be configured similar to a windshield tear off and can be removed from the windshield by pulling on one or more sides of the template. In some instances, the entire physical template is removed, whereas in other instances only a portion of the physical template is torn off. In certain examples, the physical template may comprise a release liner or other layer to prevent the physical template from sticking to a surface undesirably or prematurely. While the alignment indicator on the physical template may be fixed in position in some configurations, in other configurations, the alignment indicator may be applied post-disposition of the physical template on the windshield 100.

Figure 2:
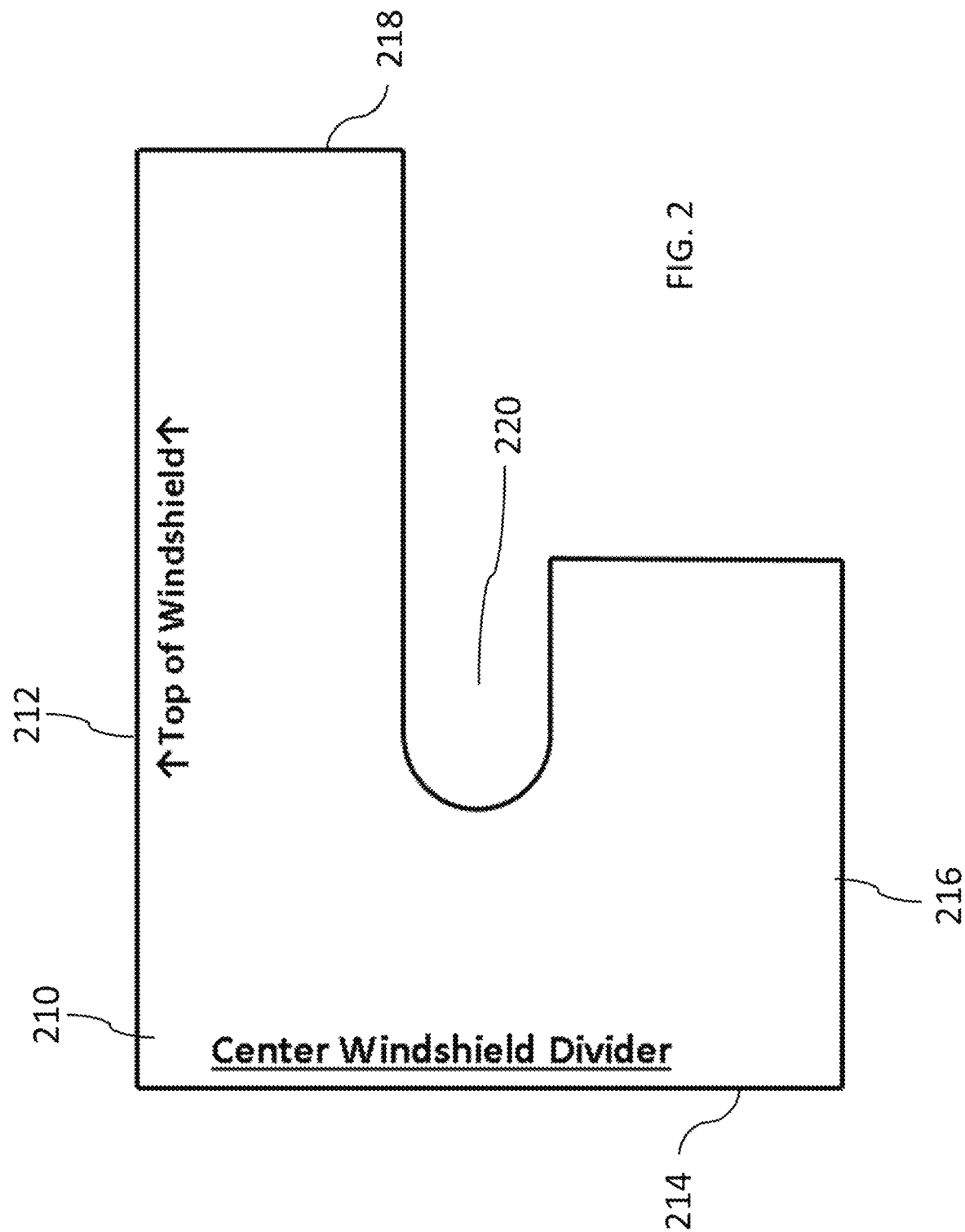
FIG. 2. an illustration of a virtual template comprising a cut-out, in accordance with certain examples.

While the physical and virtual templates are shown in certain instances as being generally rectangular, the templates can be asymmetric or may take other shapes. For example and referring to FIG. 2, a virtual template 210 is shown which can be have certain dimensions that mirror some dimension of a windshield. In some examples, the virtual template 210 may comprise a virtual alignment indicator 220, which in this configuration is configured as a cut-out. The template shown in FIG. 2 can be configured for use with a divided windshield such as those commonly found on large trucks. For example, a side 212 of the virtual template may be visualized as being against the center windshield divider, a side 214 can be visualized as being against a top surface of the windshield and a side 216 can be visualized as being against the bottom surface of the windshield. The side 218 may be visualized as being against another side of the windshield or it can be sized and arranged to not be positioned near a side of the windshield.

Figure 3:
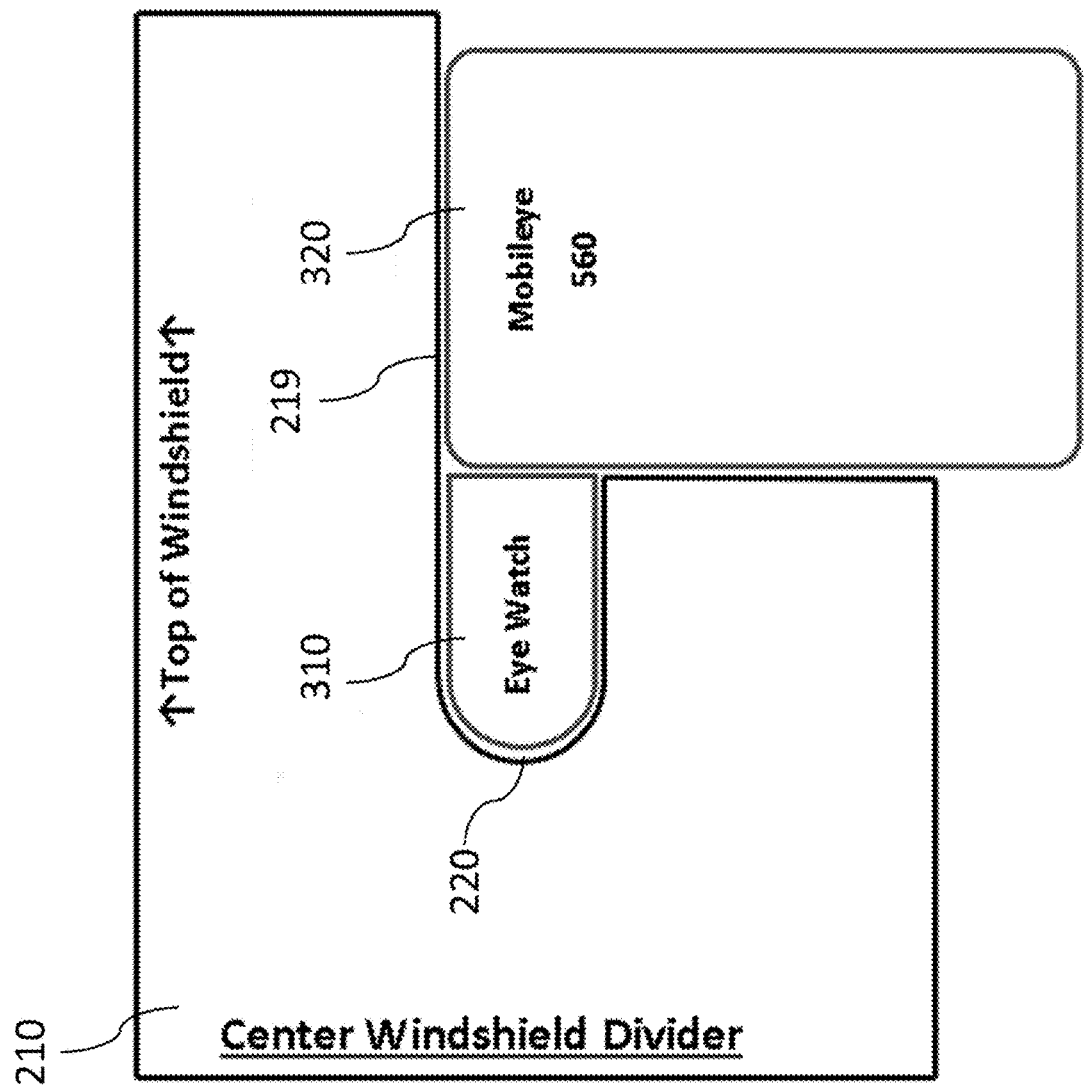
FIG. 3 is an illustration of the virtual template of FIG. 2 showing two safety devices mounted to a windshield, in accordance with certain examples.

In use of the template 210, the template 210 can be viewed using an A/R device. A first vehicle safety device 310 (see FIG. 3) is then placed against the windshield and positioned to be generally adjacent to the virtual alignment indicator 220 of the template 210. If desired, a second safety device 320 can then be placed adjacent to the first safety device 310. For example, a top surface of the safety device 320 can be placed against a virtual edge 219 of the virtual template 210 with the virtual edge 219 functioning as a second alignment indicator.

In certain embodiments, the devices 310, 320 can be the same or can be different and one of the devices can be omitted entirely if desired. In some instances, one of the safety devices used with the templates described herein may be configured to provide forward collision warnings, pedestrian collision warnings, lane departure warnings, headway warnings, provide for high beam control, provide for traffic signal recognition or perform other functions. In some examples, the vehicle safety device can be integrated with the controller of the vehicle. For example, the vehicle safety device can communicate with the vehicle through a CAN bus, OBDII port or other interface of the vehicle. The vehicle safety device typically is coupled to the 12 Volt system of the vehicle though it may comprise its own power source, e.g., battery power, solar cell, etc. The vehicle safety device typically comprises its own processor, memory unit and one or more sensors, though any one or more of these components may instead be present on the vehicle and used by the vehicle safety device.

Figure 4:
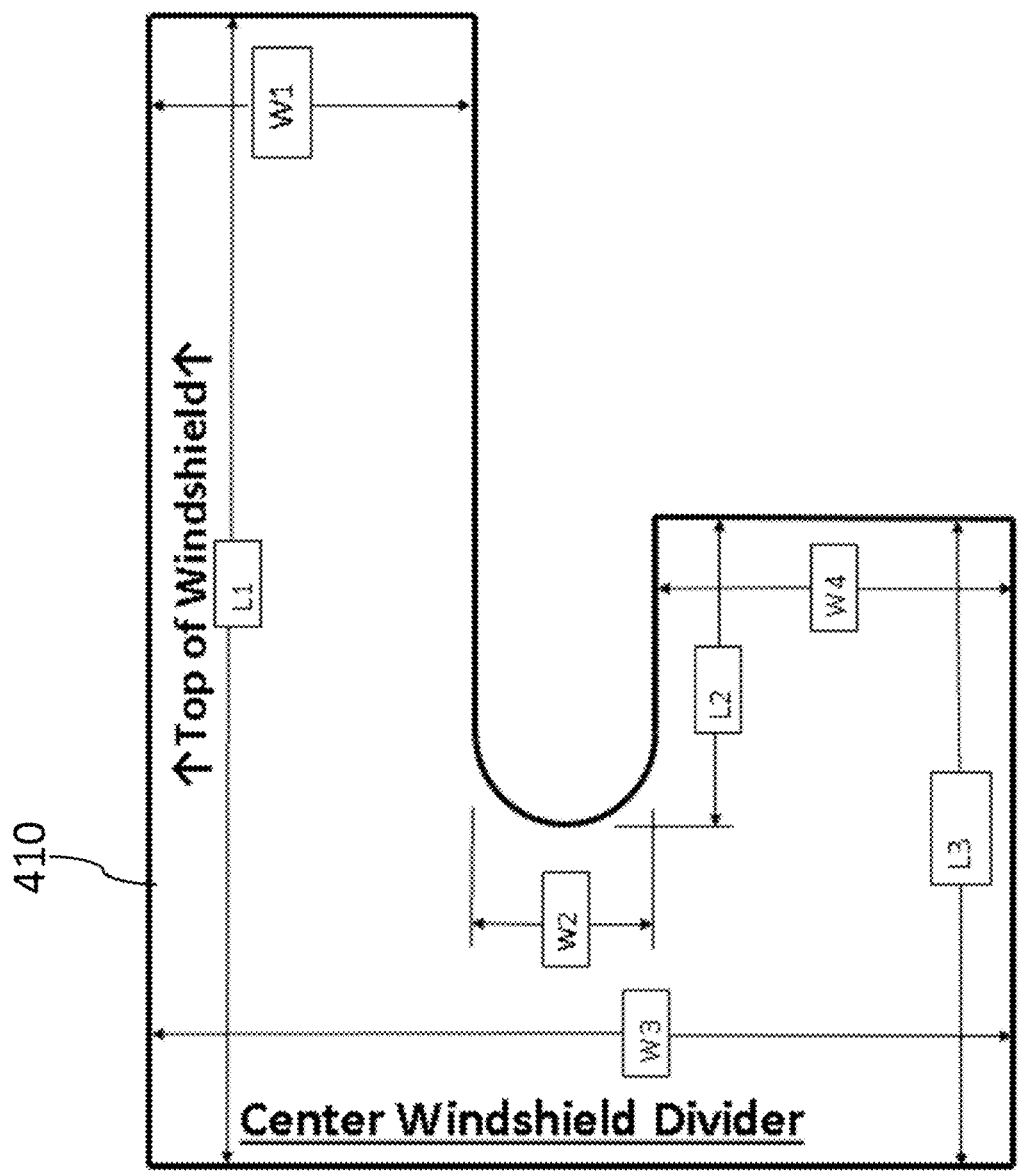
FIG. 4 shows the virtual template of FIG. 2 with certain virtual dimensions, in accordance with certain embodiments.

In certain embodiments, the exact dimensions of the virtual template can vary from template to template and depending on the type of windshield the virtual template is designed to be used. For illustration purposes, various dimensions are shown on a virtual template 410 in FIG. 4. A dimension L1 may be from about 6 inches to about 10 inches, a dimension L2 may be from about 1 inch to about 3 inches, a dimension L3 may be from about 3 inches to about 5.5 inches, a dimension W1 may be from about 1.5 inches to about 3.5 inches, a dimension W2 may be from about 0.75 inches to about 2 inches, a dimension W3 may be from about 4 inches to about 6 inches, and a dimension W4 may be from about 1.5 inches to about 4 inches. As noted herein, the exact dimensions can change depending on the distance the user of the A/R device is positioned from the windshield and/or the particular vehicle which the safety devices are being used. For example, for a Mack Pinnacle/Freightliner Cascadia truck, L1 may be about 8 inches, L2 may be about 2 inches, L3 may be about 4.25 inches, W1 may be about 2.25 inches, W2 inches may be about 1.25 inches, W3 may be about 6 inches and W4 may be about 2.5 inches. Where the template takes the form of an edge-to-edge virtual template, the virtual template generally comprises a length about the same as a length of the windshield when the virtual template is viewed from a suitable distance from the windshield, e.g., 5 feet, 10 feet, 15 feet or more. Alternatively, the virtual template may comprise a width about the same as a width of the windshield. In other configurations, the virtual template may comprise a length and a width about the same as a length and a width of the windshield.

Figure 5:
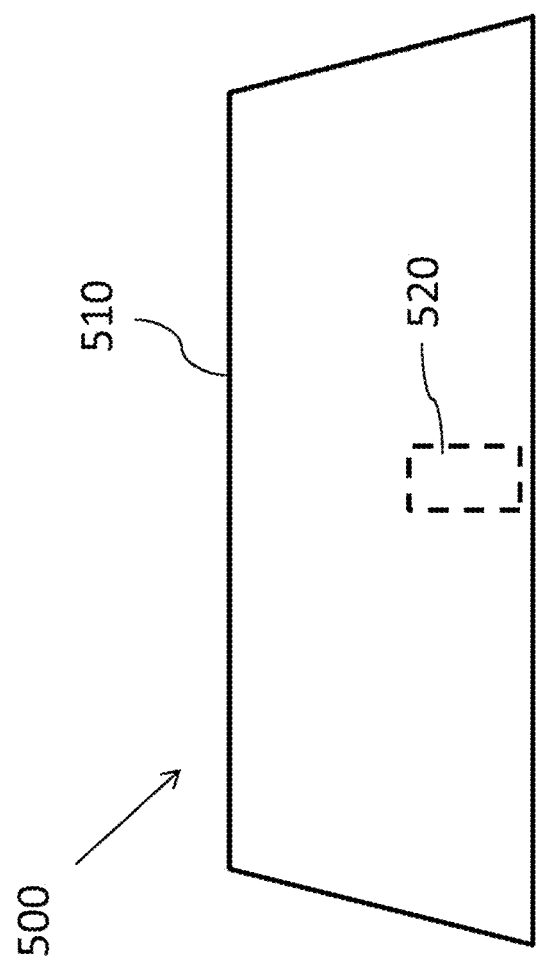
FIG. 5 shows a windshield comprising a virtual alignment indicator, in accordance with certain examples.

In certain embodiments, the alignment indicators described herein can be integrated into a vehicle windshield so a separate virtual template is not needed. One example of a vehicle windshield with an integral alignment indicator is shown in FIG. 5. The windshield 500 comprises a substrate 510 and an integral alignment indicator 520. The substrate 510 is typically glass, polycarbonate, plastic or other materials which are generally optically transparent (though they may be colored or tinted) to permit a vehicle operator to see through the substrate 510. The alignment indicator 520 may be visible under normal lighting conditions or may be visible by exposing the alignment indicator to a non-visible light source, e.g., an infrared light source, UV light source, etc. Where the windshield comprises an integral alignment indicator 520 which is viewable using visible light, the alignment indicator 520 is typically positioned outside of the viewing path of the vehicle operator so the alignment indicator 520 and any aligned/mounted safety devices do not obstruct the view of the vehicle operator. In some examples, the integral alignment indicator 520 may comprise a geometry and size that mirrors a geometry and size of a terminal region of the vehicle safety device to be mounted to the windshield. As noted herein, the vehicle safety device to be mounted to the windshield may be, for example, a vehicle safety device configured for lane keeping monitoring, collision avoidance monitoring, speed monitoring or video recording or may provide other functionalities. In some embodiments, the windshield 500 may be sized and arranged to couple to a windshield frame of a truck, a subway car, an airplane, a train car, an unmanned aerial vehicle, or a passenger automobile.

In an alternative configuration, the A/R device may only provide an alignment indicator instead of an entire virtual template. For example, the indicator 520 can be visualized through a suitable A/R device to permit the user to visualize where the safety device should be mounted.

Figure 6:
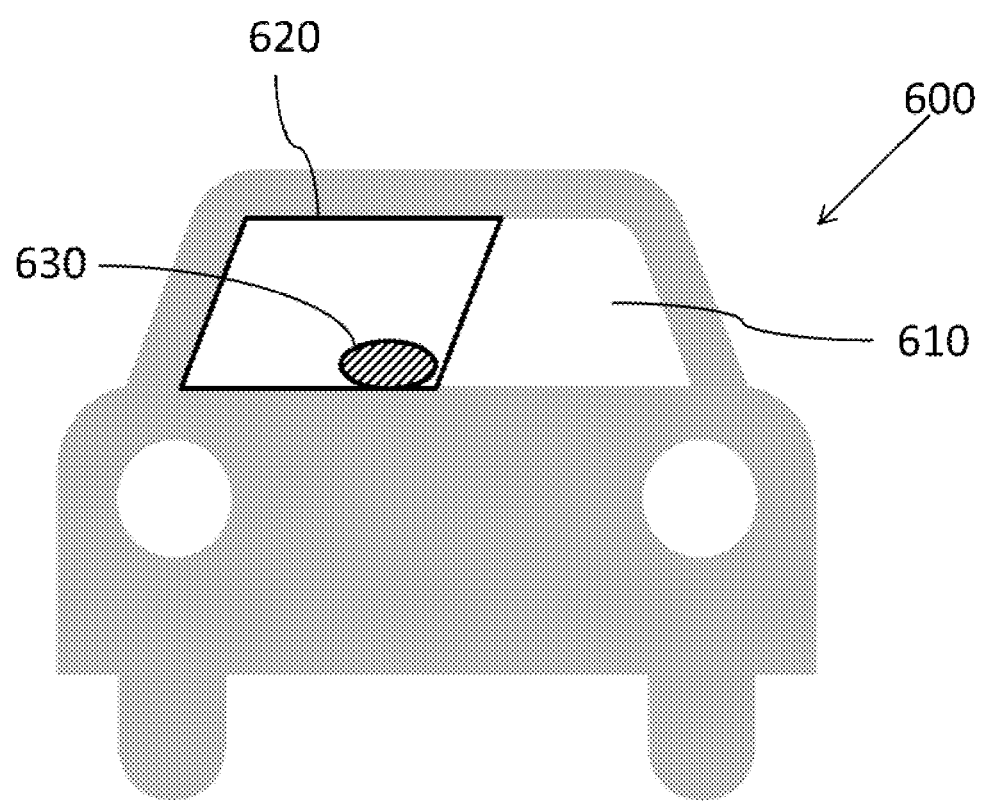
FIG. 6 shows a virtual template viewed on a passenger automobile windshield, in accordance with certain examples.

In certain examples, the templates described herein can be used with a passenger automobile to align a vehicle safety device to the windshield of the passenger automobile. Referring to FIG. 6, a passenger automobile 600 is shown that comprises a windshield 610. A virtual template 620 is shown as being visualized on top of a windshield 610. The virtual template 620 comprises a virtual alignment indicator 630 which can be used to align a vehicle safety device prior to mounting the vehicle safety device to the windshield 610. The exact nature of the passenger car can vary and includes, but is not limited to, electric powered cars, gasoline powered cars, natural gas powered cars, diesel powered cars, propane powered cars, battery powered cars and other types of passenger automobiles. The particular vehicle safety device used in the passenger vehicle can vary and may include, for example, lane keeping monitoring, collision avoidance monitoring, speed monitoring, distance monitoring, video recording or other desired functions. While a single virtual alignment indicator 630 is shown in FIG. 6, more than one virtual alignment indicator can be present if desired. Further, the exact nature of the virtual template 620 can vary, and the virtual template 620 can be opaque, optically transparent, semi-transparent, etc. or include areas which are opaque, optically transparent, semi-transparent, etc. In some instances, the template 620 can be configured as a three-dimensional template or include three-dimensional features to assist in alignment/mounting of the safety devices at a suitable distance from the windshield 610.

Figure 7:
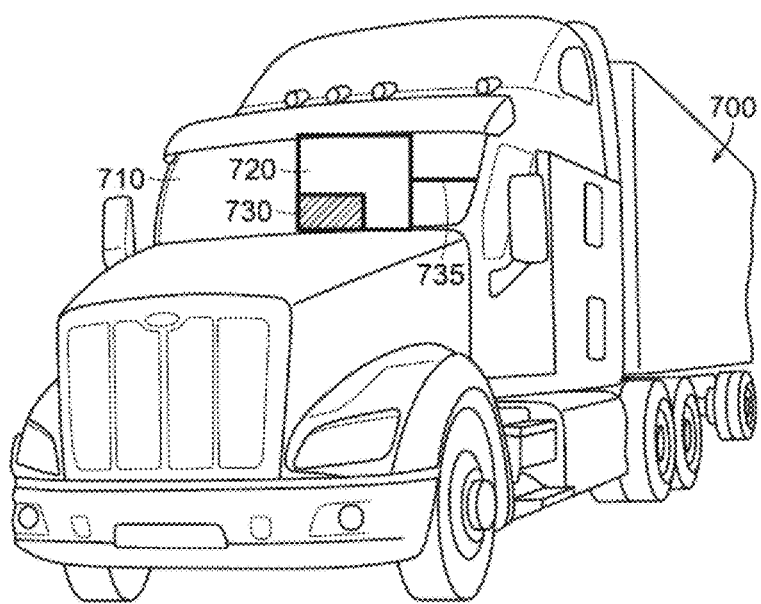
FIG. 7 shows a virtual template viewed on to a truck windshield, in accordance with certain examples.

In certain embodiments, the templates described herein can be used with a truck, e.g., a class 3-class 6 truck, to align a vehicle safety device to the windshield of the truck. Referring to FIG. 7, a truck 700 is shown that comprises a windshield 710. A virtual template 720 is shown as being visualized on top of a windshield 710. The virtual template 720 comprises a virtual alignment indicator 730 which can be used to align a vehicle safety device prior to mounting the vehicle safety device to the windshield 710. The virtual template 720 comprises a virtual tab 735 to assist in visualizing placement of the safety device. The exact nature of the truck can vary and includes, but is not limited to, electric trucks, gasoline trucks, natural gas trucks, diesel trucks, propane trucks, battery powered trucks, dump trucks, tractor trailer tractors, and other types of trucks with two, three or more axles. The particular vehicle safety device used in the truck can vary and may include, for example, lane keeping monitoring, collision avoidance monitoring, speed monitoring, distance monitoring, video recording or other desired functions. While a single virtual alignment indicator 730 is shown in FIG. 7, more than one virtual alignment indicator can be present if desired. Further, the exact nature of the virtual template 720 can vary, and the template 720 can be opaque, optically transparent, semi-transparent, etc. or include areas that are opaque, optically transparent, semi-transparent, etc. In some instances, the template 720 can be configured as a three-dimensional template or include three-dimensional features to assist in alignment/mounting of the safety devices at a suitable distance from the windshield 710.

Figure 8:
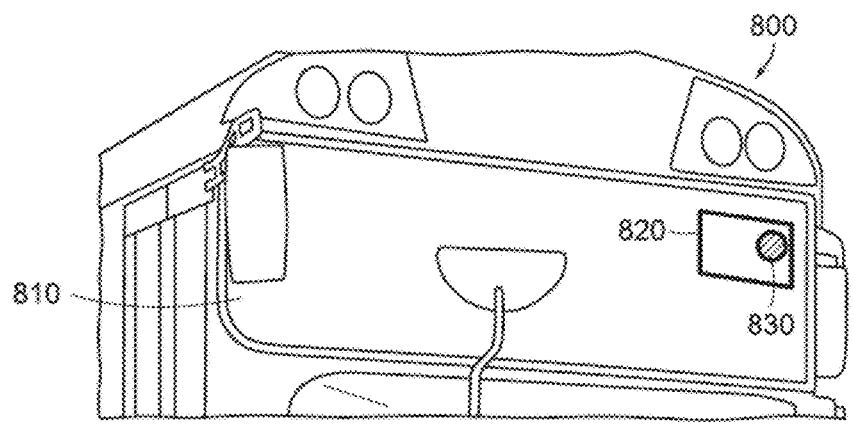
FIG. 8 shows a virtual template viewed on a bus windshield, in accordance with certain examples.

In certain configurations, the templates described herein can be used with a bus, e.g., a school bus, passenger bus, patient transport bus, etc. to align a vehicle safety device to the windshield of the bus. Referring to FIG. 8, a bus 800 is shown that comprises a windshield 810. A virtual template 820 is shown as being visualized on top of the windshield 810 through an A/R device (not shown). The virtual template 820 comprises a virtual alignment indicator 830 which can be used to align a vehicle safety device prior to mounting the vehicle safety device to the windshield 810. The virtual template 820 is shown as a two edge template that as an edge adjacent to an upper side of the windshield 810 and the left side of the windshield 810 (when the windshield 810 is viewed from the driver's seat of the bus 810). The exact nature of the bus can vary and includes, but is not limited to, electric buses, gasoline buses, natural gas buses, diesel buses, propane buses, battery powered buses, school buses, passenger buses, and other types of buses designed to carry ten or more people, for example. The particular vehicle safety device used in the bus can vary and may include, for example, lane keeping monitoring, collision avoidance monitoring, speed monitoring, distance monitoring, proximity monitoring, video recording or other desired functions. While a single virtual alignment indicator 830 is shown in FIG. 8, more than one virtual alignment indicator can be present if desired. Further, the exact nature of the virtual template 820 can vary, and the template 820 can be opaque, optically transparent, semi-transparent, etc. or include areas that are opaque, optically transparent, semi-transparent, etc. In some instances, the template 820 can be configured as a three-dimensional template or include three-dimensional features to assist in alignment/mounting of the safety devices at a suitable distance from the windshield 810.

Figure 9:
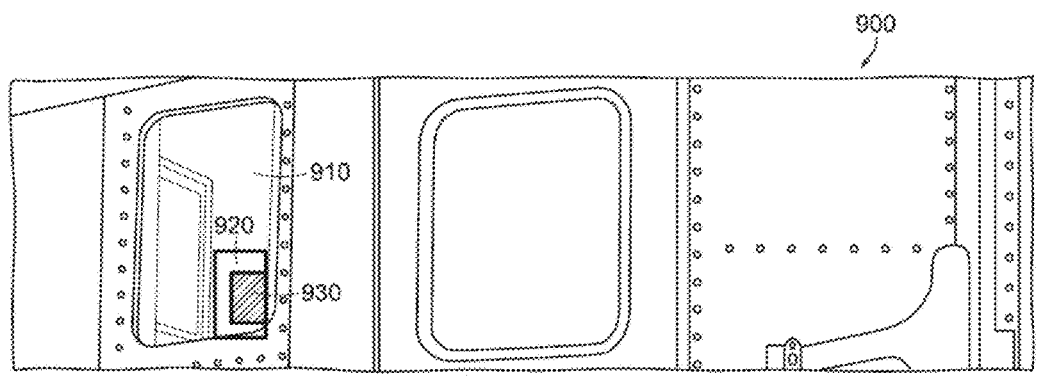
FIG. 9 shows a virtual template viewed on a subway car windshield, in accordance with certain examples.

In certain configurations, the templates described herein can be used with mass transit vehicles such as, for example, subway cars to align a vehicle safety device to the windshield of the mass transit vehicle. Referring to FIG. 9, a subway car 900 is shown that comprises a windshield 910, though the windshield 910 often takes the form of a window comprising a flat piece of glass or other material such as polycarbonate. A virtual template 920 as being visualized on top of the windshield 910 through an A/R device (not shown). The virtual template 920 comprises a virtual alignment indicator 930 which can be used to align a vehicle safety device prior to coupling the vehicle safety device to the windshield 910. The exact nature of the mass transit vehicle can vary and includes, but is not limited to, electric subway cars, gasoline subway cars, natural gas subway cars, diesel subway cars, propane subway cars, battery powered subway cars, and other types of subway cars designed to carry five or more people, for example. The particular vehicle safety device used in the mass transit vehicle can vary and may include, for example, lane keeping monitoring, collision avoidance monitoring, speed monitoring, automated speed control measurements, distance monitoring, proximity monitoring, video recording or other desired functions. While a single virtual alignment indicator 930 is shown in FIG. 9, more than one virtual alignment indicator can be present if desired. Further, the exact nature of the virtual template 920 can vary, and the template 920 can be opaque, optically transparent, semi-transparent, etc. or include areas that are opaque, optically transparent, semi-transparent, etc. In some instances, the template 920 can be configured as a three-dimensional template or include three-dimensional features to assist in alignment/mounting of the safety devices at a suitable distance from the windshield 910.

Figure 10:
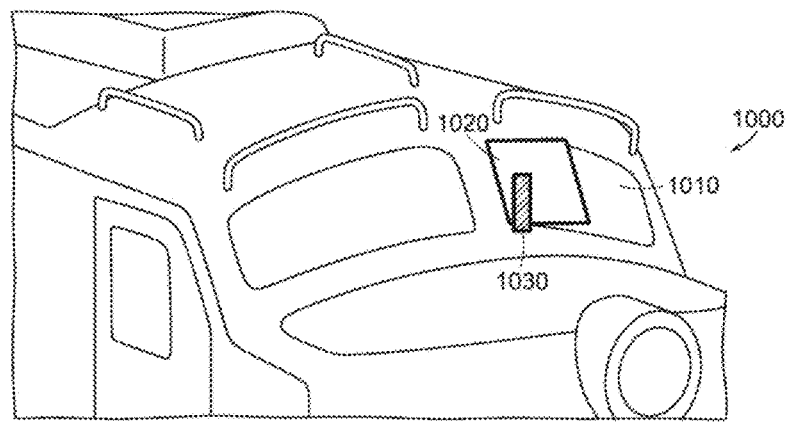
FIG. 10 shows a virtual template viewed on a train car windshield, in accordance with certain examples.

In certain examples, the templates described herein can be used with train cars, e.g., locomotives, to align a vehicle safety device to the windshield of the train car. Referring to FIG. 10, a locomotive 1000 is shown that comprises a windshield 1010. A virtual template 1020 is shown as being as being visualized on top of the windshield 1010 through an A/R device (not shown). In this configuration, the template 1020 is a three edge template as it is shown as being positioned adjacent to an upper surface of the windshield 1010, an inner divided surface of the windshield 1010 and a lower surface of the windshield 1010. The virtual template 1020 comprises a virtual alignment indicator 1030 which can be used to align a vehicle safety device prior to mounting the vehicle safety device to the windshield 1010. The exact nature of the train car can vary and includes, but is not limited to, electric train cars, gasoline train cars, natural gas train cars, diesel train cars, propane train cars, battery powered train cars, coal fired train cars and other types of train cars designed to carry five or more people, for example. The particular vehicle safety device used in the train cars can vary and may include, for example, track condition monitoring, collision avoidance monitoring, speed monitoring, automated speed control measurements, road crossing monitoring, distance monitoring, proximity monitoring, video recording or other desired functions. While a single virtual alignment indicator 1030 is shown in FIG. 10, more than one virtual alignment indicator can be present if desired. Further, the exact nature of the virtual template 1020 can vary, and the template 1020 can be opaque, optically transparent, semi-transparent, etc. or include areas that are opaque, optically transparent, semi-transparent, etc. In some instances, the template 1020 can be configured as a three-dimensional template or include three-dimensional features to assist in alignment/mounting of the safety devices at a suitable distance from the windshield 1010.

Figure 11:
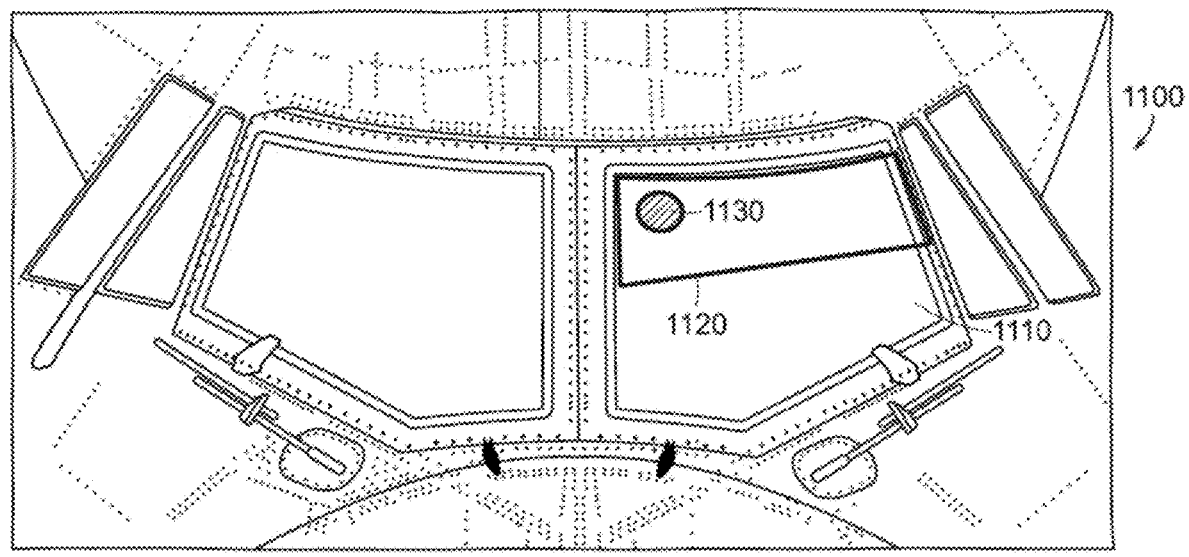
FIG. 11 shows a virtual template viewed on an airplane windshield, in accordance with certain examples.

In certain embodiments, the templates described herein can be used with airplanes or other aerospace vehicles to align a vehicle safety device to the windshield of the airplane. Referring to FIG. 11, an airplane 1100 is shown that comprises a windshield 1110. A template 1120 is shown as being visualized on top of the windshield 1110 through an A/R device (not shown). In this configuration, the template 1120 is a three edge template as it is visualized as being adjacent to an upper surface of the windshield 1110, an inner divided surface of the windshield 1110 and an outer surface (left side when viewed from the cockpit) of the windshield 1110. The template 1120 comprises a virtual alignment indicator 1130 which can be used to align a vehicle safety device prior to mounting the vehicle safety device to the windshield 1110. The exact nature of the airplane can vary and includes passenger planes, commercial planes, and military planes and may also include helicopters or other manned aerial vehicles which are not airplanes. The particular vehicle safety device used in the airplane can vary and may include, for example, object avoidance monitoring, collision avoidance monitoring, speed monitoring, automated flight control measurements, video recording or other desired functions. While a single virtual alignment indicator 1130 is shown in FIG. 11, more than one virtual alignment indicator can be present if desired. Further, the exact nature of the virtual template 1120 can vary, and the template 1120 can be opaque, optically transparent, semi-transparent, etc. or include areas that are opaque, optically transparent, semi-transparent, etc. In some instances, the template 1120 can be configured as a three-dimensional template or include three-dimensional features to assist in alignment/mounting of the safety devices at a suitable distance from the windshield 1110.

Figure 12:
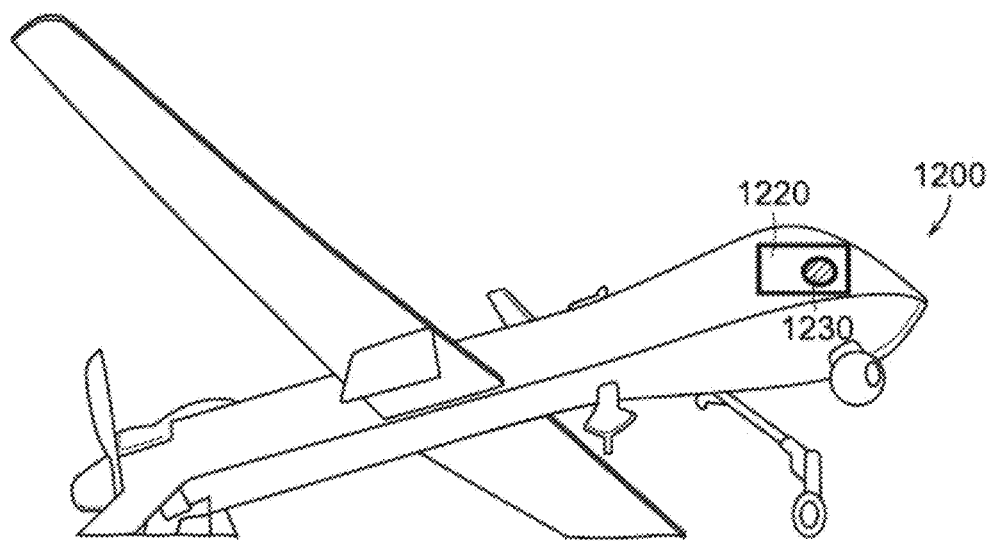
FIG. 12 shows a virtual template viewed an unmanned aerial vehicle, in accordance with certain examples.

In certain embodiments, the templates described herein can be used with unmanned aerial vehicles or satellites. Referring to FIG. 12, an unmanned aerial vehicle 1200, e.g., a drone, is shown that comprises an opening (obscured by the template 1220). While the opening is not a true windshield since a driver or operator is not physically present in the vehicle 1200, the opening can be used to permit the vehicle safety device to be mounted and/or used. A template 1220 is shown as being visualized on top of the opening through an A/R device (not shown). In this configuration, the template 1220 is a four edge template (or edge-to-edge template) as it is shown as being adjacent to each side of the opening. The template 1220 comprises a virtual alignment indicator 1230 which can be used to align a vehicle safety device prior to coupling the vehicle safety device to the windshield 1210. The exact nature of the unmanned aerial vehicle can vary and includes drones, satellites, weather vehicles or other aerial vehicles. The particular vehicle safety device used in the aerial vehicle can vary and may include, for example, object avoidance monitoring, collision avoidance monitoring, speed monitoring, automated flight control measurements, temperature monitoring, pressure monitoring, video recording or other desired functions. While a single virtual alignment indicator 1230 is shown in FIG. 12, more than one virtual alignment indicator can be present if desired. Further, the exact nature of the virtual template 1220 can vary, and the template 1220 can be opaque, optically transparent, semi-transparent, etc. or include areas that are opaque, optically transparent, semi-transparent, etc. In some instances, the template 1220 can be configured as a three-dimensional template or include three-dimensional features to assist in alignment/mounting of the safety devices at a suitable distance from the windshield 1210.

The templates described herein can be used in connection with other types of vehicles including, but not limited to, ships, submarines or other vehicles. Further, the template can be configured with different shapes, sizes and materials depending on the overall shape, size, etc. of the windshield or opening the template is reversibly coupled.

In certain embodiments, the templates described herein can be used with a mask to enhance viewing of the virtual or physical alignment indicators. For example, an opaque mask can be applied to one side of the windshield and used to obscure areas of the windshield other than the area or position where the virtual alignment indicator of the template is positioned. The mask can be separate from any physical template or present within the physical template or windshield. In other instances, any integral physical alignment marks may be viewable using infrared light or other non-visible light to permit the template to remain on the windshield post-installation of the vehicle safety device. For example, the template may be integral to window tint film which can be applied to the inner surface of a windshield. The window tint film may comprise integral alignment markings which can be viewed using normal visible light, infrared light or other means. The presence of markings which are viewable using non-visible light permits installation of the vehicle safety device without the template markings interfering with normal viewing through the windshield.

In use of the template described herein, a user can visualize the virtual template using a suitable A/R device. The vehicle safety device is then aligned with the virtual alignment indicator on the virtual template prior to mounting the vehicle safety device to (or near) the windshield of the vehicle. Once the vehicle safety device is mounted, the user may switch off the virtual template. In some examples, the virtual template may comprise electronic information on it to provide guidance to the vehicle operator regarding use of the vehicle safety devices. As noted herein, the virtual template can be visualized on the inside or the outside of the windshield. The virtual template may comprise one, two, three or more virtual alignment indicators. The virtual template can be configured with a raised surface configured to receive a terminal end of the vehicle safety device.

As noted herein, the augmented reality devices used to visualize the templates typically comprise a processor and one or more sensors that can be used to aid in visualization of a virtual template to position safety devices in a proper position. Illustrative sensors include a camera, an accelerometer, MEMS sensors, solid state sensors, a compass, a GPS device, optical sensors, RFID sensors or other suitable sensors and electronic components. In certain configurations, the A/R device may comprise a processor that is typically electrically coupled to one or more memory units to receive data from the other components of the system and permit viewing of the virtual template through the A/R device. The processor may be part of a general-purpose computer such as those based on Unix, Intel PENTIUM-type processor, Motorola PowerPC, Sun UltraSPARC, Hewlett-Packard PA-RISC processors, or any other type of processor and can be integral to the AR device or may provide information to the AR device through a wired or wireless interface. One or more of any type computer system may be used according to various embodiments of the technology. Further, the system may be connected to a single computer or may be distributed among a plurality of computers attached by a communications network. As noted herein, the computer may take the form of a mobile device such as a cellular phone, laptop, tablet or other portable electronic devices. It should be appreciated that other functions, including network communication, can be performed and the technology is not limited to having any particular function or set of functions. Various aspects may be implemented as specialized software executing in a general-purpose computer system. The A/R device or system may include a processor connected to one or more memory devices, such as a disk drive, memory, or other device for storing data. Memory is typically used for storing programs, storing virtual templates, storing windshield dimensions and data values used during the mounting of the safety devices. Components of the A/R device or system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The A/R device can receive and/or issue commands within a processing time, e.g., a few milliseconds, a few microseconds or less, to permit rapid control of the A/R device to alter the size of the virtual template as the user moves their position with respect to the windshield. The processor typically is electrically coupled to a power source which can, for example, be a battery, a fuel cell, an AC voltage, a DC voltage or other power sources or combinations of power sources. The power source can be shared by the other components of the system. The system may also include one or more input devices, for example, a keyboard, mouse, trackball, microphone, touch screen, manual switch (e.g., override switch), joystick and one or more output devices, for example, a printing device, display screen, speaker, etc. In addition, the system may contain one or more communication interfaces that connect the A/R device to a communication network (in addition or as an alternative to the interconnection device). The A/R device may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, Wi-Fi, Near Field Communication or other wireless protocols and/or interfaces.

In certain embodiments, the storage system used in the A/R device described herein typically includes a computer readable and writeable nonvolatile recording medium in which codes of software can be stored that can be used by a program to be executed by the processor or information stored on or in the medium to be processed by the program. The medium may, for example, be a hard disk, solid state drive, memory chip or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the A/R device may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The A/R device may comprise a general-purpose computer system that is programmable using a high-level computer programming language. The A/R device may be also implemented using specially programmed, special purpose hardware. In the A/R device, the processor is typically a commercially available processor such as the well-known Pentium class processors available from the Intel Corporation or an ARM based processor such as those used in mobile devices from Apple, Inc. and Samsung, Inc. Many other processors are also commercially available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion, iOS or other operating systems available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the A/R device or system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. The server may comprise, for example, a database of virtual templates which can be selected by the A/R device depending on the particular windshield being used or vehicle to which the windshield is coupled. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the systems remotely as desired. For example, a mobile device can be used in combination with smart glasses to permit visualization of the virtual template on a windshield.

In certain examples, the processor may also comprise or have access to a database of information about vehicles, windshields, templates, etc. The database can include further data information relating to the safety devices which can be used to generate the virtual template in a suitable position on a windshield.

In some instances, the A/R device can be packaged into a kit with instructions for use of the A/R device with a virtual template. The kit may comprise the A/R device, an optional physical template and written instructions and may also include, if desired, a windshield. In some examples, the kit comprises a windshield with software program present on a drive, e.g., a USB drive, etc. which includes the virtual template to be used in placement of the vehicle safety devices on the windshield. In some examples, the virtual template is sized and arranged to be smaller than a width and a length of the vehicle windshield of the kit. In other examples, the virtual template comprises about a same length and about a same width as a length and a width of the vehicle windshield of the kit. If desired, the kit may also comprise one or more safety devices such as, for example, vehicle safety devices configured for lane keeping monitoring, collision avoidance monitoring, speed monitoring or video recording. In some embodiments, the vehicle windshield of the kit is sized and arranged to couple to a windshield frame of a truck, a passenger automobile, a subway car, an airplane, a train car, an unmanned aerial vehicle or other vehicles.

Figure 13:
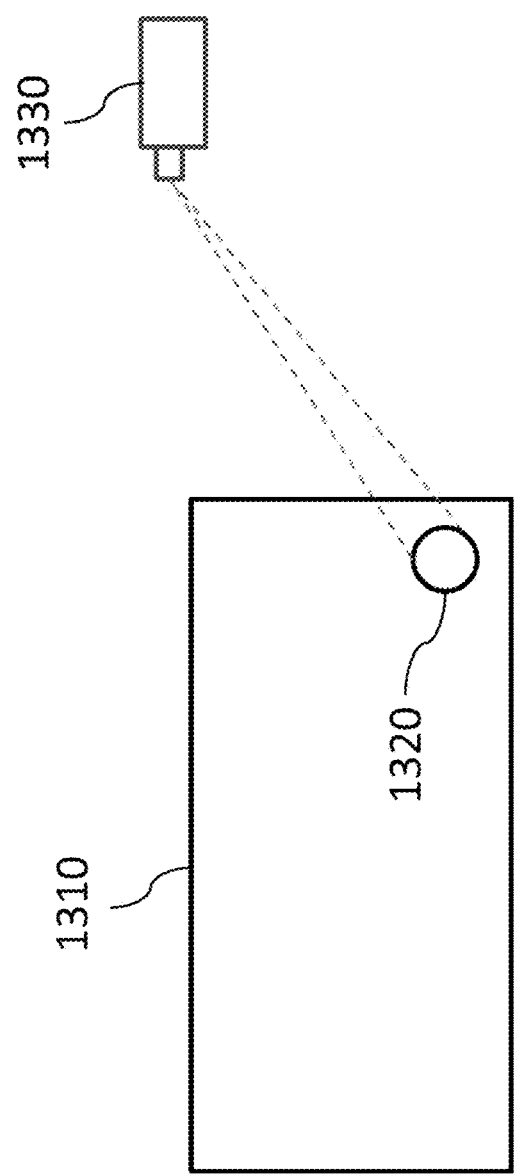
FIG. 13 shows a projected virtual indicator on a windshield, in accordance with certain examples.

In certain embodiments, a virtual template can be projected onto a surface of the windshield and used to align the vehicle safety device. For example and referring to FIG. 13, a projected alignment indicator 1320 is shown as being projected onto a windshield 1310 from a projection device 1330. The projection device 1330 may be a projector, phone, mobile device, tablet, computer, etc. and can be coupled to some portion of the vehicle, e.g., the rear view mirror, headrest, etc. to provide for proper projection of the indicator 1320 on the windshield 1310. A vehicle safety device can be mounted to the windshield at the position of the indicator 1330, and then the projected indicator 1320 can be switched off.

While the virtual templates described herein are described as being used in connection with windshields or openings, the templates could instead be used with bumpers, rear windshields, side mirrors, side windows or other structures present in the vehicle. Further, more than one virtual template can be used with different areas of the vehicle to align and/or mount a safety device in a desired position.

Certain examples are described to illustrate some of the novel aspects of the technology described herein.

EXAMPLE 1

Figure 14:
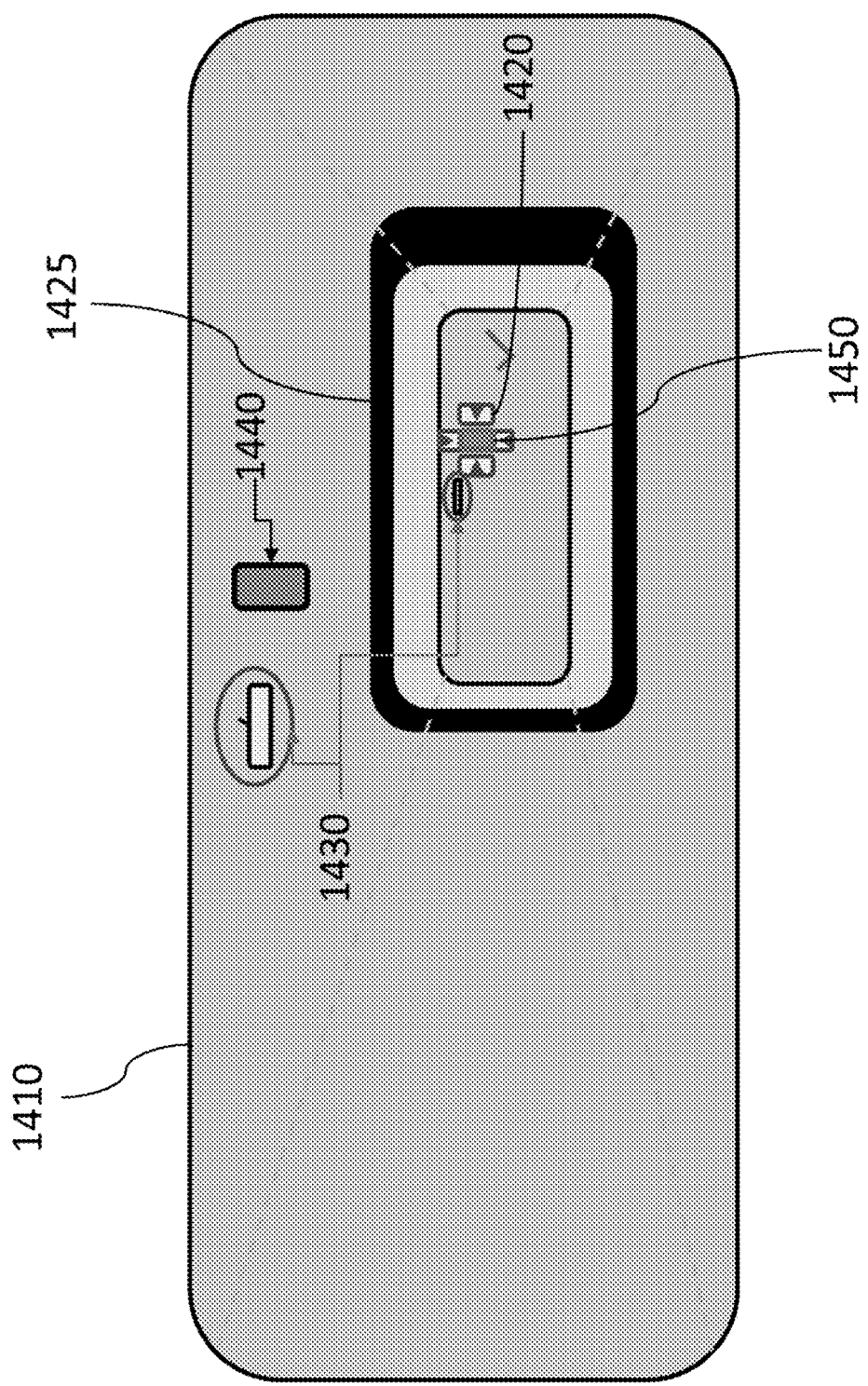
FIG. 14 is an illustration of a virtual template and A/R device that can be used to mount a safety device to a vehicle windshield.

Referring to FIG. 14, an Augmented Reality (A/R) positioning method can use cameras and sensors of an A/R device 1425 to aid in the positioning of safety devices 1440, 1450 at a vehicle windshield 1410. One instance uses an A/R marker 1430 or object recognition to locate itself in relation to the vehicle's windshield 1410. It can then display the correct position of the safety equipment on the windshield and uses audible tones or visual alerts to position the equipment correctly on the windshield. For example, alignment indicators (collectively 1420) can be displayed through the A/R device 1425 to permit placement of the safety device 1450 between the indicators 1420. The A/R device 1425 may gather the correct positioning of the device 1450 by snapshotting the position of it prior to a windshield replacement or through a positioning library on the device 1425 or through a connection to a remote database. The A/R device 1425 can be a variety of devices from cellphones and tablets to smart glasses with sensors and displays built into them. The application provides a technician with the ability to initially mount or remount safety devices 1440, 1450 to the vehicle windshield 1410 without the need to use a physical template.

Figure 15A:
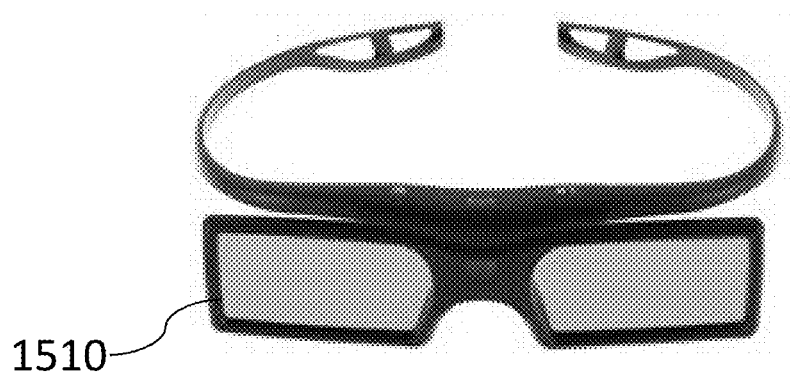
FIGS. 15A, 15B, 15C and 15D are illustrations of various augmented reality devices, in accordance with some embodiments.
Figure 15B:
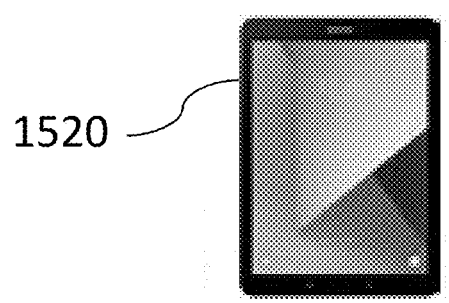
Figure 15C:
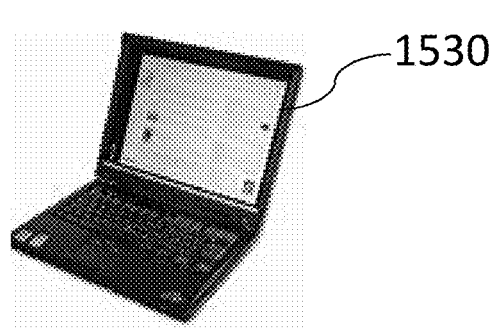
Figure 15D:
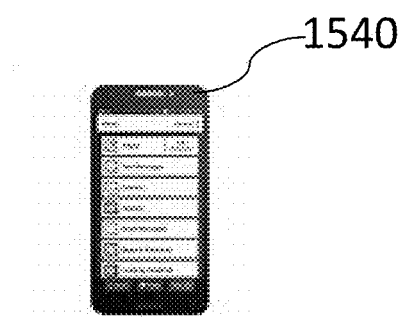

Many different types of A/R devices can be used to view the A/R marker 1430 including wearable glasses 1510 (FIG. 15A), a tablet 1520 (FIG. 15B), a laptop 1530 (FIG. 15C) or other computer or a cellular phone 1540 (FIG. 15D) or other mobile device.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A method of mounting a vehicle safety device to a windshield of a vehicle, the method comprising:
   visualizing a virtual template on the windshield of the vehicle using an augmented reality device, the virtual template comprising at least one virtual alignment indicator present on the virtual template in a first position, wherein the first position corresponds to a position where a vehicle safety device is to be mounted to the windshield of the vehicle; and
   aligning the vehicle safety device with the virtual alignment indicator on the virtual template prior to mounting the vehicle safety device to the windshield of the vehicle.

2. The method of claim 1, wherein the augmented reality device is a mobile device.

3. The method of claim 2, wherein the mobile device is a cellular phone.

4. The method of claim 2, wherein the mobile device is a tablet.

5. The method of claim 1, further comprising configuring the virtual template with a second virtual alignment indicator.

6. The method of claim 1, wherein a size of the virtual template changes as a user of the augmented reality device gets closer to the windshield.

7. The method of claim 1, wherein the vehicle is one of a passenger automobile, a truck, a train, a bus, a subway car, an airplane or an unmanned aerial vehicle.

8. The method of claim 1, further comprising removing the virtual alignment indicator from view on the virtual template after the vehicle safety device is mounted.

9. The method of claim 1, wherein the virtual template is viewed from an interior of the vehicle.

10. The method of claim 1, wherein the virtual template is viewed from an exterior of the vehicle.

11. The method of claim 1, further comprising using the augmented reality device to determine a size of the windshield and retrieving the virtual template from a database using the determined size of the windshield.

12. The method of claim 11, wherein the database is located on a device remote from the augmented reality device.

13. The method of claim 1, further comprising scanning a mounting position of the aligned vehicle safety device.

14. The method of claim 13, further comprising testing the scanned mounting position by displaying an image on the augmented reality device.

15. The method of claim 1, further comprising configuring the augmented reality device as wearable glasses.

16. A kit for mounting a vehicle safety device to a windshield of a vehicle, the kit comprising:
   an augmented reality device configured to provide a virtual template on the windshield to permit alignment and mounting of the vehicle safety device to the windshield; and
   instructions for using the augmented reality device to align and mount the vehicle safety device to the windshield.

17. The kit of claim 16, further comprising application software comprising a plurality of different virtual templates.

18. The kit of claim 16, wherein the augmented reality device comprises wearable glasses.

19. The kit of claim 16, wherein the augmented reality device comprises a mobile device.

20. The kit of claim 19, wherein the mobile device is a cellular phone, a tablet or a laptop computer.

* * * * *